July 29, 1947. W. W. REMY 2,424,946
STALL WARNING DEVICE
Filed March 21, 1945 2 Sheets-Sheet 1
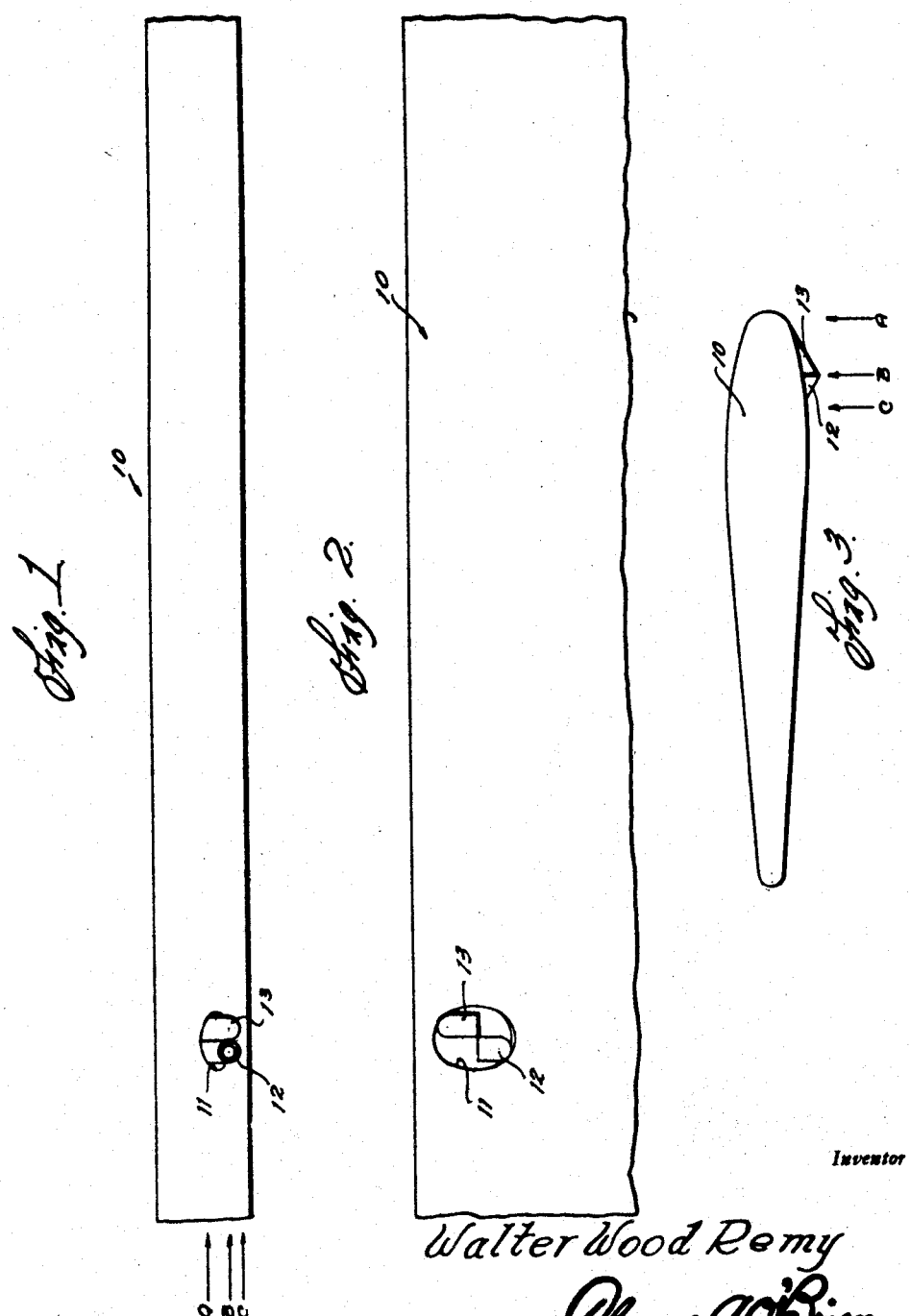

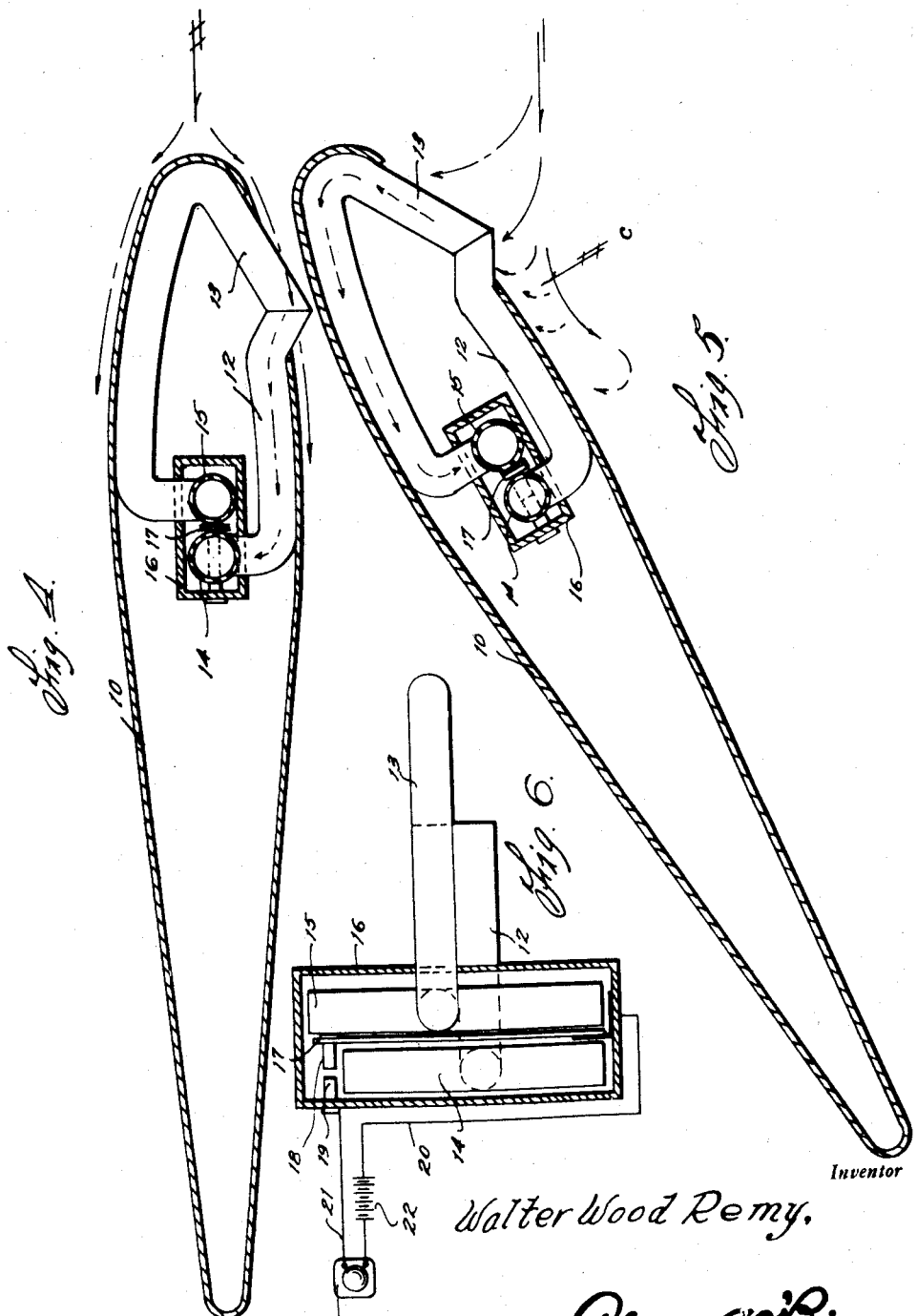

Patented July 29, 1947

2,424,946

UNITED STATES PATENT OFFICE 2,424,946

STALL WARNING DEVICE

Walter Wood Remy, Angola, Ind.

Application March 21, 1945, Serial No. 583,883

3 Claims. (Cl. 177—311)

This invention relates to a stall warning device, and more particularly to such a device adapted to be used with aircraft. A primary object of this invention is the provision of an improved stall warning device, particularly adapted for use with airplanes not using de-icer boot or the like, which may be readily installed and positioned in an aircraft wing, and which, when the angle of stall is approached, will give suitable indication to the operator of the plane that a stall is imminent.

An additional object of the invention is the provision of such a device wherein the exposed parts are reduced to a minimum.

A further object of the invention is the provision of such a device which may be readily installed on any conventional type of aircraft with a minimum of structural rearrangement or dislocation.

Still another object of the invention is the provision of such a device which may be readily constructed of a comparative minimum of operating parts, and at a minimum cost.

A still further object of the invention is the provision of such a device wherein the working parts or the indicating apparatus, are not exposed, and may be so positioned as to permit the use of filters or the like to preclude the possibility of the ingress of foreign matter to damage the same.

Still another object is the provision of such a device which is sturdy and durable in construction, reliable and efficient in operation, and relatively simple and inexpensive to manufacture, assemble and install.

Further objects reside in the combinations of elements, arrangements of parts, and features of construction, all as will be more fully pointed out hereinafter and disclosed in the accompanying drawings wherein there is shown a preferred embodiment of this inventive concept.

In the drawings:

Figure 1 is a fragmentary front elevational view of the wing of an aircraft, as viewed from the leading edge thereof, Figure 2 is a bottom plan view of a fragment of the wing shown in Figure 1, Figure 3 is an end elevational view schematic in nature, showing the location of the device, Figures 4 and 5 are enlarged cross sectional views taken through the wing of a plane, showing the principles of operation of the device, and showing the parts in two different positions of adjustment, and Figure 6 is a top plan view of the device, showing schematically a wiring diagram therefor.

Similar reference characters refer to similar parts throughout the several views of the drawings.

Having reference now to the drawings, there is generally indicated at 10 a fragment of the wing of an aircraft of any desired type, which has a relatively small aperture 11 cut therein, through which extend the extremities of two tubes 12 and 13, open at their ends, one of which faces the trailing edge of the wing, and the other of which faces the leading edge. The tubes 12 and 13 are offset from each other in such manner as to provide no interference with the free passage of air into the mouth of either.

The tubes 12 and 13 are connected, respectively, to expansible diaphragm members 14 and 15, within a suitable casing or housing 16, in the illustrative embodiment shown, but may be utilized, in a manner to be more fully pointed out hereinafter, to actuate any desired conventional signalling mechanism. In the embodiment shown, the two expansible diaphragms 14 and 15 are positioned on opposite sides of a contact carrying arm 17, provided with a contact 18, adapted to engage, under certain conditions, a fixed contact 19 on the side wall of the casing 16, to actuate through wires 20 and 21, and battery 22, an audible or visual signal 23.

The positioning of the opening 11, and its associated tubes 12 and 13, may be suitably varied as desired for varying types of aircraft and varying conditions, but its preferable location is on the underside of the wing, adjacent the leading edge thereof, and so positioned that in normal, level flight, the airflow about the wing causes a greater pressure in the tube 12, that is, the tube facing the leading edge, than in the other tube. As the angle of attack is increased, as best shown in Figure 5, a pressure reversal takes place, which causes an increase of pressure through the tube 13, and a relative decrease of pressure through the tube 12. This increase of pressure of the tube 13 causes expansion of the member 15, which in turn acts on the contact carrying arm 17 to close the contacts 18 and 19 and actuate the indicator 23. In the schematic illustration of the device, and particularly in Figures 1 and 3, three lines, A, B, and C, are shown. A indicates the point of separation of the air over the upper and lower surfaces of the wing during normal flight, B indicates the line at which a pressure reversal is started, sufficient to actuate the device of the instant invention, while C indicates the line at which actual stall will take place. It will now be seen, that as the plane rises out of level flight, to a point where a stall is imminent, the reversal of pressure of the airflow being indicated by arrows in Figures 4 and 5, will actuate the indicating device of the instant invention, and thus warn the pilot to return his plane to level flight.

From the foregoing, it will now be seen that there is herein provided an improved stall warning device, which may be installed with a minimum of difficulty in a desired location in any type of plane, either at the factory, or as an accessory, wherein the exposed operating parts are reduced to a minimum and the remainder of the operating mechanism may be contained in any desired locality in the plane, which accomplishes all the objects of this invention and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative and not in a limiting sense.

I claim:

1. In a stall warning device for aircraft having a wing, two oppositely disposed pressure sensitive elements facing the leading and trailing edges of the wing, and so positioned that during level flight the pressure on the forwardly facing element exceeds that on the rearwardly facing element, and an indicator operable upon reversal of said pressure occasioned by reversal of the air flow over the wing.

2. In a stall warning device for aircraft having a wing, two oppositely disposed pressure sensitive elements facing the leading and trailing edges of the wing, and so positioned that during level flight the pressure on the forwardly facing element exceeds that on the rearwardly facing element, and an indicator operable upon reversal of said pressure occasioned by reversal of the air flow over the wing, said elements comprising open ended tubes.

3. A stall warning device for aircraft having a wing, comprising, means positioned at a point to the rear of the normal parting line of the air during level flight, but to the front of the normal parting line of the air when stall conditions are approached, said means responding to changes in air pressure during flight, at said point, as the stall position of the wing is approached, to actuate an indicator, said means comprising a pair of tubes, downwardly pointing, forwardly and rearwardly of said wing.

WALTER WOOD REMY.

REFERENCES CITED

The following references are of record in the file of this patent:

UNITED STATES PATENTS

| Number | Name | Date |
| --- | --- | --- |
| 1,786,841 | Gilbert | Dec. 30, 1930 |
| 2,008,885 | Upson | July 23, 1935 |
| 2,343,281 | Crane | Mar. 7, 1944 |
| 2,297,412 | Hoppe | Sept. 29, 1942 |
| 2,110,730 | Holland | Mar. 8, 1938 |

OTHER REFERENCES

The Vane Type Stall Indicating Device, Aero Digest, January 1, 1945, pages 102, 103.